United States Patent [19]

Hasegawa et al.

[11] Patent Number: 5,293,572
[45] Date of Patent: Mar. 8, 1994

[54] TESTING SYSTEM OF COMPUTER BY GENERATION OF AN ASYNCHRONOUS PSEUDO-FAULT

[75] Inventors: Isao Hasegawa; Atsushi Takahashi, both of Tokyo, Japan

[73] Assignee: NEC Corporation, Tokyo, Japan

[21] Appl. No.: 697,242

[22] Filed: May 8, 1991

[30] Foreign Application Priority Data

May 9, 1990 [JP] Japan ................................ 2-119368

[51] Int. Cl.$^5$ ...................... G01R 31/28; G06F 11/00
[52] U.S. Cl. .......................................... 371/3; 395/575
[58] Field of Search ...................... 371/3, 18; 395/575

[56] References Cited

U.S. PATENT DOCUMENTS

| | | |
|---|---|---|
| 4,669,081 | 5/1987 | Mathewes, Jr. et al. ............... 371/3 |
| 4,835,459 | 5/1989 | Hamlin et al. ........................... 371/3 |
| 4,891,809 | 1/1990 | Hazawa ..................................... 371/3 |
| 4,984,239 | 1/1991 | Suzuki et al. ............................ 371/3 |
| 5,058,112 | 10/1991 | Namitz et al. .......................... 371/3 |

*Primary Examiner*—Charles E. Atkinson
*Attorney, Agent, or Firm*—Foley & Lardner

[57] ABSTRACT

The testing system is provided with a diagnostic processing apparatus which is independent from a computer to be tested. The diagnostic processing apparatus operates based on a clock signal which is separate from another clock signal used in the computer to asynchronously issue a fault generation command to the computer. The computer is provided with a register for storing particular fault mode information. The computer is responsive to the issued fault generation command for enabling the stored fault mode information so as to generate an asynchronous pseudo-fault in the computer for testing purpose.

16 Claims, 3 Drawing Sheets

TESTING SYSTEM OF COMPUTER BY GENERATION OF AN ASYNCHRONOUS PSEUDO-FAULT

BACKGROUND OF THE INVENTION

The present invention relates to a testing system of a computer, and more particularly relates to a testing system of a computer having a diagnostic processing apparatus which is independent from the computer to be tested.

The conventional testing system of computers of such type will be described briefly with reference to FIG. 1. This system operates such that a computer apparatus 202 is provided with a firmware control unit 209 operative to set fault mode information in order to generate a pseudo-fault in synchronization with a clock signal of the computer apparatus 202. Namely, the fault mode information is set in a fault information register 203 provided in the computer apparatus 202 and a fault enabling bit latch 204 is set so that an output of a decoder 205 is enabled concurrently with this setting to generate a fault or error at a given location of the computer apparatus 202.

The fault processing is effected as follows, when a fault is generated in the computer apparatus 202. Firstly, a particular error indicating flag 207 is turned on to notify a diagnostic processing apparatus 201, through a fault notifying line 210, of the fact that normal operation is disabled. The diagnostic processing apparatus 201 carries out the fault processing when receiving the notice. In the fault processing, the error indicating flags 207 are extracted from the computer apparatus 202, and the error indicating flag 207 etc. is cleared to remove the fault state, and then re-start processing is initiated.

As long as the synchronous operation is held according to the internal clock signal of the computer apparatus 202, fault mode information can be effectively set in the fault information register 203 to repeatedly generate a fault at an identical timing. Further, since the same fault can be recreated, an expectation value of the fault can be suitably set by a program for fault testing, thereby facilitating confirmation of RAS function of the computer apparatus 202 and the diagnostic processing apparatus 201. These processings are illustratively indicated in a flow chart of FIG. 2.

However, an actual fault may occur in the computer apparatus asynchronously with its internal clock. Therefore, an actual fault may not be simultaneously created by a synchronous pseudo-fault generating means. Thus, an asynchronous pseudo-fault generating means is needed to carry out effective RAS function testing.

Next, a brief description is given for the method of generating an asynchronous fault in the computer apparatus 202. During the operation of the computer apparatus 202, for example, its external control signal pin or terminal is clamped to a logical level "0" to fix the logical level of the control signal to generate an asynchronous pseudo-fault. Then, the computer operation, the fault processing and the diagnostic processing are tested. In such case, the external control signal is generally taken from an interface between logical packages.

The clamping of the external control signal pin may cause electrical noise, while the level of the control signal changes asynchronously with the clock signal of the computer apparatus 202. Since an actual hardware fault occurs in an analog mode asynchronously with the operation of the computer apparatus 202, the above noted method can generate a pseudo-fault which is more similar to an actual hardware fault.

However, the following problems may be caused when generating an asynchronous pseudo-fault by the above noted conventional computer testing method. Since highly integrated and sophisticated design is required in the modern computer, it would be quite difficult to generate an asynchronous pseudo-fault by simply clamping the external control signal pin as in the above noted prior art. The reason is that the clamping operation is physically difficult to perform during the operation in view of the hardware construction of the computer, and that a pseudo-fault cannot be generated closely at a particular designated spot by clamping an interface signal between packages. Further, in situations where the computer apparatus, the diagnostic processing apparatus and a terminal are remotely installed from one another, for example, on separate floors, it would be quite inconvenient to access the external control signal pin.

SUMMARY OF THE INVENTION

An object of the invention is to, therefore, provide an improved function of generating an asynchronous pseudo-fault in the testing system of a computer. The inventive testing system of a computer is provided with a diagnostic processing apparatus which is independent from a computer apparatus to be tested. The diagnostic processing apparatus operates based on a separate clock signal which is different from another clock signal used in the computer apparatus, and is provided with a fault setting means for supplying a fault generation command to the computer apparatus. On the other hand, the computer apparatus is provided with a fault information holding means for holding fault mode information, and a fault enabling means for enabling the fault mode information in response to the fault generation command, so as to generate a given fault in the computer apparatus according to the enabled fault mode information.

DETAILED DESCRIPTION OF EMBODIMENT

Figure 1:
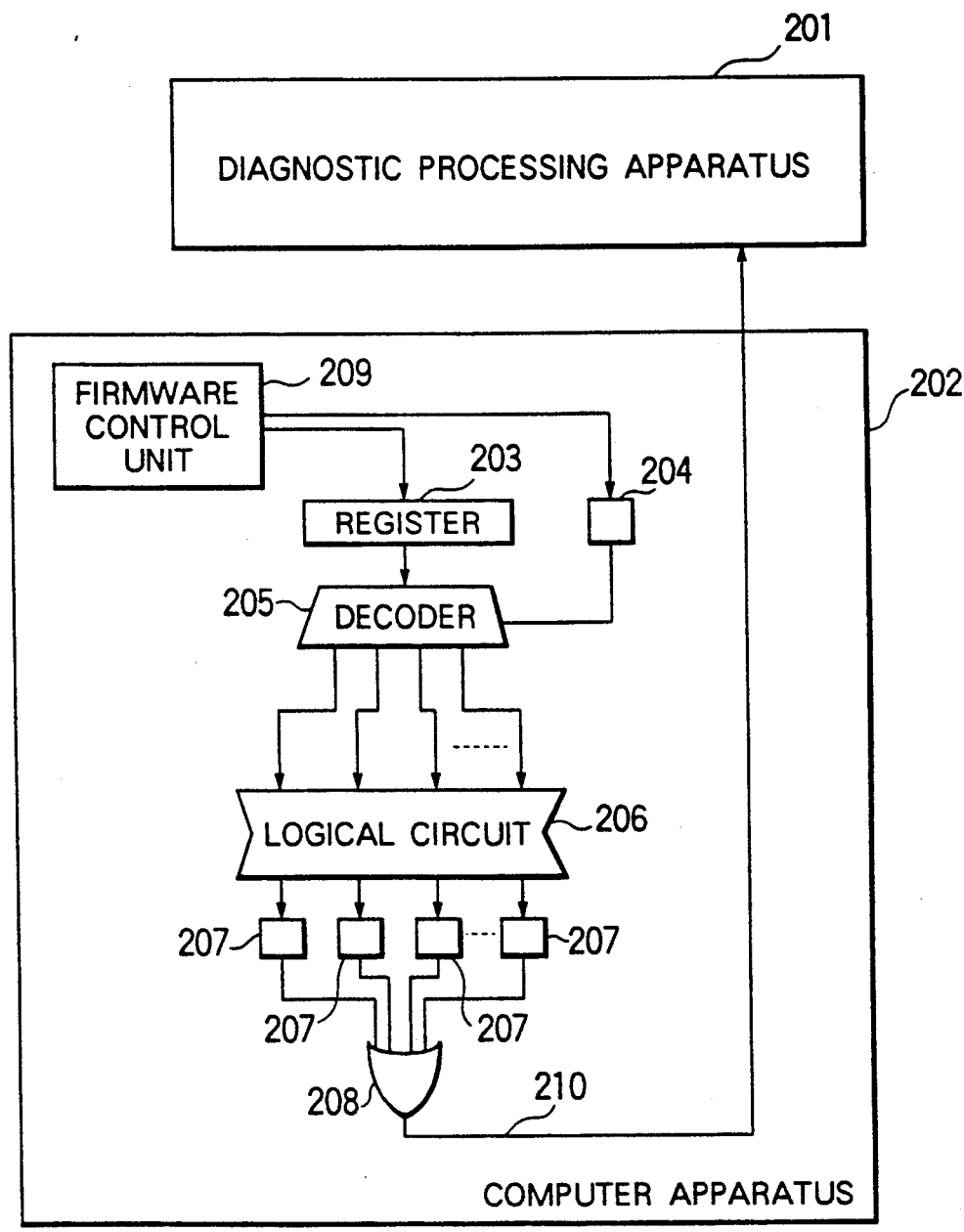
FIG. 1 is a block diagram showing the prior art system.
Figure 2:
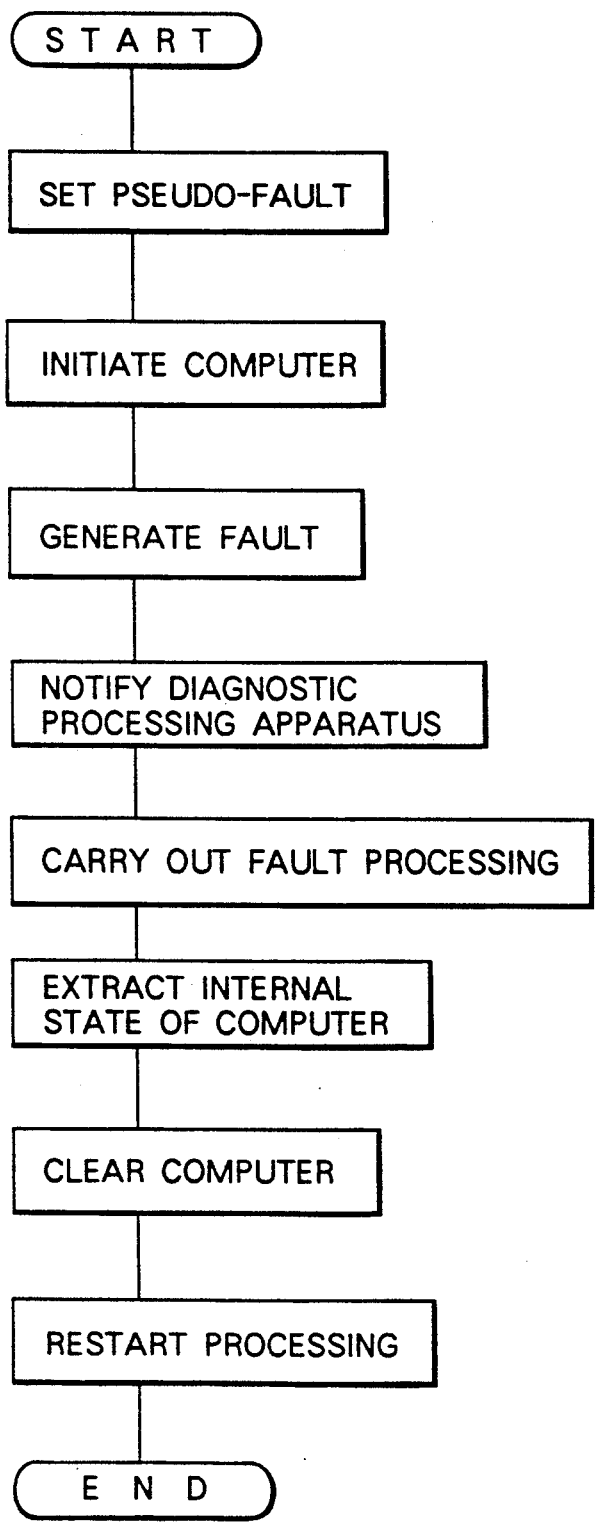
FIG. 2 is a flow chart showing the operation of the prior art system.
Figure 3:
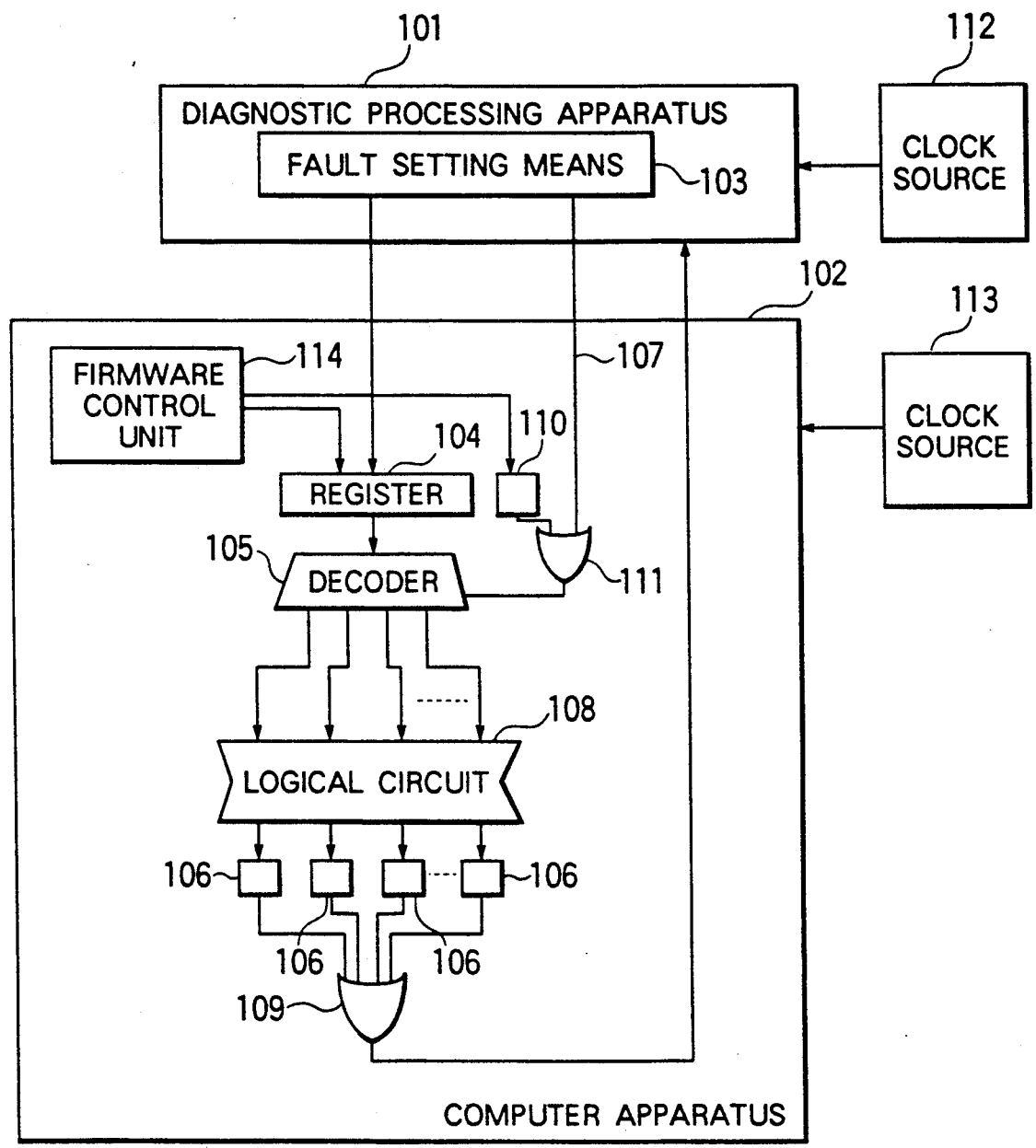
FIG. 3 is a block diagram showing one embodiment of the present invention.

Hereinafter, the present invention will be described in detail with reference to the drawings. FIG. 3 shows one embodiment of the inventive testing system. In FIG. 3, a diagnostic processing apparatus 101 is of the independent type operative based on a clock signal from a clock source 112, which is separate from another clock source 113 of a computer apparatus 102.

The computer apparatus 102 is provided with a firmware control unit 114 having a synchronous pseudo-fault generating function commanded by a firmware in synchronization with an internal clock signal. This function is carried out through a fault enabling bit latch 110 and an OR gate 111 in manner similar to those provided in the before-mentioned prior art.

In addition to this function, the inventive system has the following asynchronous pseudo-fault generating function. When generating a pseudo-fault in the computer apparatus 102, the diagnostic processing apparatus 101 operates to set, in a fault information register 104 of the computer apparatus 102, particular fault mode information which indicates a given pseudo-fault. Namely, the fault information register 104 holds or registers the information representative of a designated fault location and a fault mode.

A fault setting means 103 of the diagnostic processing apparatus 101 issues a fault generation command 107 to the computer apparatus 102. A fault information decoder 105 is enabled by this fault generation command 107 through the OR gate 111 to decode an output from the fault information register 104, to thereby generate a fault at a designated location in the computer apparatus 102. The fault generation command 107 is issued asynchronously with the clock signal of the computer apparatus 102 so as to generate an asynchronous pseudo-fault, thereby effecting test of the RAS function including fault processing and diagnostic processing in the operative computer apparatus 102 and the diagnostic processing apparatus 101. In treating a fault asynchronous with the clock signal of the computer apparatus, since its expectation value is not clear, the asynchronous fault may not be suitable for testing by incorporating fault information in a test program. However, the inventive system can generate a fault which is similar to an actual fault in a practical computer apparatus. Such simulative fault could not be obtained in the form of a synchronous pseudo-fault.

According to the invention, setting and commanding of pseudo-fault information is carried out by the diagnostic processing apparatus driven by a clock signal which is different from another clock used in the computer apparatus. By such operation, an asynchronous pseudo-fault can be generated and tested in the computer apparatus by controlling through terminals of the diagnostic processing apparatus, without accessing an external control signal pin of the apparatus. Accordingly, there is achieved an effect to carry out testing of the RAS function such as fault processing and diagnostic processing in the operative computer apparatus and the diagnostic processing apparatus. For example, the fault processing is carried out such that a particular error indicating flag 106 is turned on by a logical circuit 108 in response to an occurrence of a pseudo-fault, thereby notifying the diagnostic processing apparatus 101 through an OR gate 109 and a fault notice line the fact that normal operation is disabled. Then, the diagnostic processing apparatus 101 carries out fault processing as well as diagnostic processing when receiving the notice.

What is claimed is:

1. A testing system of a computer, comprising:
   (A) a diagnostic processing apparatus independent from a computer to be tested including fault setting means for providing a fault generation command to the computer, operative based on a first clock signal separate from a second clock signal used in the computer; and
   (B) a computer, including:
      (1) fault information holding means for holding fault mode information representative of a pseudo-fault location in the computer, set by the diagnostic processing apparatus; and
      (2) fault enabling means responsive to the fault mode information, for generating an asynchronous pseudo-fault in the computer based on the fault mode information, for use in testing the computer.

2. A testing system as claimed in claim 1, further comprising a first clock source for generating and transmitting the first clock signal to the fault setting means.

3. A testing system as claimed in claim 2, further comprising a second clock source for generating and transmitting the second clock signal to the computer.

4. A testing system as claimed in claim 3, wherein the second clock source is internal to the computer.

5. A testing system of a computer, comprising:
   (A) a diagnostic processing apparatus operative based on a first clock signal, including:
      (1) fault setting means for issuing a fault generation command;
      (2) a first clock resource for issuing the first clock signal;
   (B) a computer connected to the diagnostic processing apparatus, including:
      (1) a second clock source separate from the first clock source, for issuing a second clock signal;
      (2) a firmware control unit having a synchronous pseudo-fault generating function, synchronous with the second clock signal;
      (3) a fault enabling bit latch connected to an output of the firmware control unit;
      (4) a logical-OR gate connected to an output of the fault enabling bit latch, responsive to the fault generation command; and
      (5) a fault information register with fault mode information indicating a given pseudo-fault, responsive to the diagnostic processing apparatus.

6. A testing system as claimed in claim 5, wherein the fault information register stores information representative of a designated fault location and a fault mode.

7. A testing system as claimed in claim 6, wherein the second clock source is internal to the computer.

8. A testing system as claimed in claim 5, wherein the diagnostic processing apparatus sets fault mode information in the fault information register.

9. A testing system as claimed in claim 8, wherein the computer further comprises a fault information decoder enabled by an output of the logical-OR gate for decoding an output from the fault information register and generating a fault at a designated location in the computer apparatus.

10. A testing system as claimed in claim 9, wherein the computer further comprises:
    (1) a logical circuit connected to the decoder, responsive to an output of the decoder; and
    (2) a plurality of error indicating flags, set by the logical circuit.

11. A testing system as claimed in claim 10, wherein the computer further comprises a fault notice line responsive to the error indicating flags, connected to the diagnostic processing apparatus, indicating if normal operation of the computer is disabled.

12. A method of testing a computer system, comprising the steps of:
    (A) providing a fault generating command to a computer from a diagnostic processing apparatus independent from the computer to be tested, based on a first clock signal separate from a second clock signal used in the computer;
    (B) holding fault mode information representative of a pseudo-fault location in the computer in a fault information holding means in the computer, set by the diagnostic processing apparatus;

(C) enabling the held fault mode information responsive to the fault generation command, and generating an asynchronous pseudo-fault in the computer based on the fault mode information, for use in testing the computer.

13. A method as claimed in claim 12, further comprising the step of generating and transmitting the first clock signal from a first clock source to the diagnostic processing apparatus.

14. A method as claimed in claim 13, further comprising the step of generating and transmitting the second clock signal from a second clock source to the computer.

15. A method as claimed in claim 14, wherein the second clock is internal to the computer.

16. A method as claimed in claim 12, further comprising the step of setting fault mode information by the diagnostic processing apparatus in the fault information holding means.

* * * * *